United States Patent
Shimoda et al.

(10) Patent No.: US 10,816,707 B2
(45) Date of Patent: Oct. 27, 2020

(54) GOLD COLOR TONE MULTILAYER COAT AND REFLECTOR INCLUDING THE SAME

(71) Applicant: SONY CORPORATION, Tokyo (JP)

(72) Inventors: Kazuhito Shimoda, Aichi (JP); Yasuro Nakagawa, Aichi (JP)

(73) Assignee: SONY CORPORATION, Tokyo (JP)

( * ) Notice: Subject to any disclaimer, the term of this patent is extended or adjusted under 35 U.S.C. 154(b) by 144 days.

(21) Appl. No.: 15/773,853

(22) PCT Filed: Sep. 20, 2016

(86) PCT No.: PCT/JP2016/004266
§ 371 (c)(1),
(2) Date: May 4, 2018

(87) PCT Pub. No.: WO2017/090218
PCT Pub. Date: Jun. 1, 2017

(65) Prior Publication Data
US 2019/0064409 A1 Feb. 28, 2019

(30) Foreign Application Priority Data
Nov. 27, 2015 (JP) .................. 2015-231238

(51) Int. Cl.
| | | |
|---|---|---|
| *G02B 1/10* | (2015.01) | |
| *G02B 5/28* | (2006.01) | |
| *B32B 9/00* | (2006.01) | |
| *B32B 15/04* | (2006.01) | |
| *G02B 5/26* | (2006.01) | |

(52) U.S. Cl.
CPC .............. *G02B 5/285* (2013.01); *B32B 9/00* (2013.01); *B32B 15/04* (2013.01); *G02B 5/26* (2013.01); *G02B 5/28* (2013.01)

(58) Field of Classification Search
CPC ... G02B 1/00; G02B 1/10; G02B 5/08; G02B 5/0816; G02B 5/0825; G02B 5/0833; G02B 5/0841; G02B 5/085; G02B 5/0858; G02B 5/0866; G02B 5/0875; G02B 5/28; G02B 5/281; G02B 5/282; G02B 5/285; G02B 5/286; G02B 5/287
USPC ....... 359/577, 580, 582, 584, 585, 586, 588, 359/589, 590
See application file for complete search history.

(56) References Cited

U.S. PATENT DOCUMENTS 10,222,524 B2 * 3/2019 Brown .................. G02C 7/10

FOREIGN PATENT DOCUMENTS

| JP | 01-167702 A | 7/1989 |
|---|---|---|
| JP | 01-208344 A | 8/1989 |
| JP | 06-220610 A | 8/1994 |

(Continued)

OTHER PUBLICATIONS

International Search Report and Written Opinion of PCT Application No. PCT/JP2016/004266, dated Dec. 20, 2016, 09 pages of ISRWO.

*Primary Examiner* — Arnel C Lavarias
(74) *Attorney, Agent, or Firm* — Chip Law Group (57) ABSTRACT

[Solving Means] A gold color tone multilayer coat includes a metal film and a multilayer film layer. The multilayer film layer includes a plurality of dielectric films respectively having two or more different refractive indices and the dielectric films having different refractive indices are alternately laminated.

8 Claims, 7 Drawing Sheets

| Layer | Material | Film thickness (nm) |
|---|---|---|
| 6 | $Nb_2O_5$ | 60 |
| 5 | $SiO_2$ | 90 |
| 4 | Nb | 20 |
| 3 | $Nb_2O_5$ | 90 |
| 2 | $SiO_2$ | 80 |
| 1 | Al | 100 |
| Base material | - | - |

(56) References Cited

FOREIGN PATENT DOCUMENTS

| JP | 06-256929 A | 9/1994 |
|----|-------------|--------|
| JP | 2004-269916 A | 9/2004 |

\* cited by examiner

FIG.1

| Layer | Material | Film thickness (nm) |
|---|---|---|
| 6 | $SiO_2$ | 50 |
| 5 | $Nb_2O_5$ | 70 |
| 4 | $SiO_2$ | 110 |
| 3 | $Nb_2O_5$ | 70 |
| 2 | $SiO_2$ | 80 |
| 1 | Ti | 100 |
| Base material | - | - |

| Layer | Material | Film thickness (nm) |
|---|---|---|
| 4 | $SiO_2$ | 50 |
| 3 | $Nb_2O_5$ | 70 |
| 2 | $SiO_2$ | 80 |
| 1 | Cu | 100 |
| Base material | - | - |

| Layer | Material | Film thickness (nm) |
|---|---|---|
| 6 | $Nb_2O_5$ | 60 |
| 5 | $SiO_2$ | 90 |
| 4 | Nb | 20 |
| 3 | $Nb_2O_5$ | 90 |
| 2 | $SiO_2$ | 80 |
| 1 | Al | 100 |
| Base material | - | - |

GOLD COLOR TONE MULTILAYER COAT AND REFLECTOR INCLUDING THE SAME

CROSS REFERENCE TO RELATED APPLICATIONS

This application is a U.S. National Phase of International Patent Application No. PCT/JP2016/004266 filed on Sep. 20, 2016, which claims priority benefit of Japanese Patent Application No. JP 2015-231238 filed in the Japan Patent Office on Nov. 27, 2015. Each of the above-referenced applications is hereby incorporated herein by reference in its entirety.

TECHNICAL FIELD

The present technology relates to a gold color tone multilayer coat that generates gold tone color and a reflector including the same.

BACKGROUND ART

In the related art, there are products to which coatings that artificially generate gold color are applied, for example, without using expensive gold.

For example, a transparent plate having gold-reflected color disclosed in Patent Literature 1 includes a glass plate on which a titanium oxide (TiN) film and a metal oxide dielectric film are formed.

A gold-color deposited film disclosed in Patent Literature 2 includes low refractive index layers formed of a substance having a refractive index of 1.3 to 1.5 and high refractive index layers formed of a substance having a refractive index of 2.0 or more alternately laminated on a base such that an outermost layer is the high refractive index layer.

A reflector disclosed in Patent Literature 3 includes a reflection control layer having reflection and absorption spectra similar to gold color formed directly on a silver film or above a silver film via other transparent layer. As a result, reflected light having color close to gold is achieved.

CITATION LIST

Patent Literature

Patent Literature 1: Japanese Patent Application Laid-open No. 1-208344
Patent Literature 2: Japanese Patent Application Laid-open No. 6-256929
Patent Literature 3: Japanese Patent Application Laid-open No. 6-220610

DISCLOSURE OF INVENTION

Technical Problem

However, the technologies disclosed in Patent Literatures 1 to 3 have problems that a reflectance is low as compared with a reflectance of actual gold color and the like. An improved layer structure for being close to gold color is required.

An object of the present disclosure is to provide a gold color tone multilayer coat that may have reflection properties as close as possible to those of gold and a reflector including the same.

Solution to Problem

In order to achieve the object, a gold color tone multilayer coat according to the present technology includes a metal film and a multilayer film layer.

The multilayer film layer includes a plurality of dielectric films respectively having two or more different refractive indices and the dielectric films having different refractive indices are alternately laminated.

According to this structure, reflection properties as close as possible to those of gold can be achieved.

The multilayer film layer may include a thin-film having an extinction coefficient higher than an extinction coefficient of each of the plurality of dielectric films.

According to this structure, a color shift from gold be suppressed in a case where an incidence angle is increased. In other words, the reflection properties as close as possible to those of gold can be achieved in a side wavelength region.

The metal film may be formed of Al, Ag, Cu, Ti, Ta, Nb, Co, Cu, Fe, In, Mn, Mo, Ni, or W.

The multilayer film layer may include $SiO_2$, and $Nb_2O_5$, $Ta_2O_5$, or $TiO_2$ having a refractive index higher than a refractive index of the $SiO_2$.

The metal film may be formed of Ti and the multilayer film layer may include at least five dielectric films. Alternatively, the metal film may be formed of Cu and the multilayer film layer may include at least three dielectric films. Alternatively, the metal film may be formed of Al and the multilayer film layer may include at least five dielectric films.

The multilayer film layer may include a first layer pair and a second layer pair and the thin film may be disposed between the first layer pair and the second pair.

The first layer pair may include a first dielectric film and a second dielectric film having a refractive index higher than a refractive index of the first dielectric film and the second layer pair may include the first dielectric film and the second dielectric film.

A reflector according to the present technology includes a base material and the gold color tone multilayer coat disposed on the base material.

Advantageous Effects of Invention

As described above, according to the present technology, a gold color tone multilayer coat that may have reflection properties as close as possible to those of gold and a reflector including the same can be provided.

It should be noted that the effects described here are not necessarily limitative and may be any of effects described in the present disclosure.

MODE(S) FOR CARRYING OUT THE INVENTION

Hereinafter, an embodiment of the present disclosure will be described with reference to the drawings.

1. REFLECTOR INCLUDING GOLD COLOR TONE MULTILAYER COAT

Figure 1:
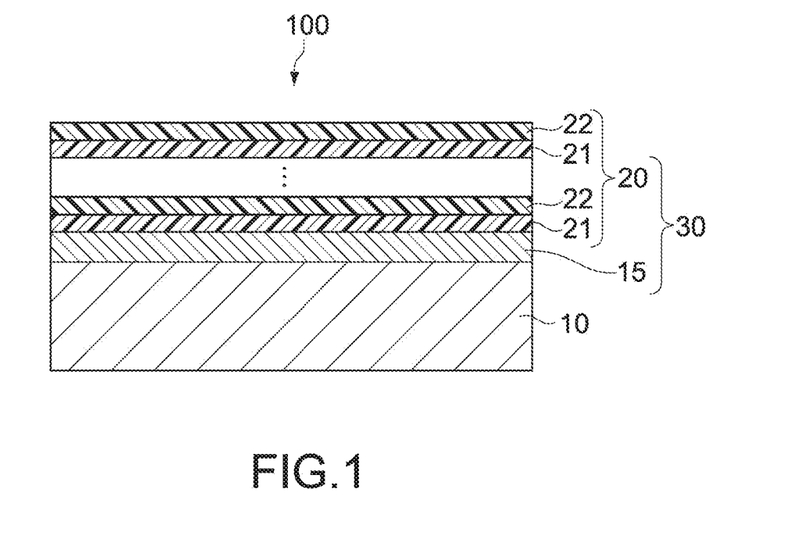
FIG. 1 is a cross-sectional view showing a reflector including a gold color tone multilayer coat according to an embodiment of the present technology.

FIG. 1 is a cross-sectional view showing a reflector including a gold color tone multilayer coat (hereinafter simply referred to as a "multilayer coat") according to an embodiment of the present technology.

The "reflector" may be a finished product (final product) or may be a component. A reflector 100 is applicable to a housing of, including but not limiting to, an electronic device such as a smart phone and a tablet, and to any other products.

The reflector 100 includes a base material 10 and a multilayer coat 30 disposed on the base material 10. Examples of a material of the base material 10 include resin, metal, glass, and ceramics.

The multilayer coat 30 includes a metal film 15 disposed on the base material 10 and a multilayer film layer 20 disposed on the metal film 15. The multilayer film layer 20 includes a plurality of dielectric films (21, 22 . . . ) respectively having two or more different refractive indices and the dielectric films 21 and 22 having different refractive indices are alternately laminated.

As a material of the metal film 15, Al, Ag, Cu, Ti, Ta, Nb, Co, Cu, Fe, In, Mn, Mo, Ni, or W is used, for example.

"Alternately laminating" the dielectric films means that at least three dielectric films 21, 22 . . . having two or more different refractive indices are laminated. The multilayer film layer 20 is made by laminating at least a first dielectric film 21 having a first refractive index, a second dielectric film 22 having a second refractive index higher than the first refractive index, and further the first dielectric film 21, in this order from a base material 10 side.

The multilayer film layer 20 may include a third dielectric film having a third refractive index different from the first refractive index and the second refractive index. In this case, it is assumed that the first dielectric film, the second dielectric film, the third dielectric film, the first dielectric film, the second dielectric film . . . are laminated, in this order from the base material 10 side.

In addition, "alternately laminating" the dielectric films also means that a film (for example, a metal thin-film as described later) other than the dielectric films is inserted in the lamination of the dielectric films.

An upper limit of the number of the dielectric films 21 and 22 of the multilayer film layer 20 is not especially limited, but is practically 10 to 30.

As a material of the dielectric film 21 or 22, $SiO_2$, $MgF$, $Nb_2O_5$, $Ta_2O_5$, $TiO_2$, or the like is used. Each of $SiO_2$ and $MgF$ is a material having a low refractive index (first dielectric film 21), and each of $Nb_2O_5$, $Ta_2O_5$, and $TiO_2$ is a material having a high refractive index (second dielectric film 22).

Note that a protective layer that is a transparent film may be disposed on the multilayer coat 30 as an uppermost layer. The protective layer may be desirably formed relatively thick, e.g., having a thickness of 100 nm or more.

The film thickness of the metal film 15 is typically 50 nm or more and 500 nm or less, but is not limited to this range. More desirably, the film thickness is 70 nm or more and 300 nm or less.

The film thickness of the each of the dielectric films 21 and 22 of the multilayer film layer 20 is typically 30 nm or more and 300 nm or less, but is not limited to this range. More desirably, the film thickness is 50 nm or more and 200 nm or less.

Examples of a method of producing the reflector 100 include PVD (Physical Vaper Deposition), CVD (Chemical Vapor Deposition), and the like.

An alternative method of producing the reflector 100 includes forming the multilayer coat 30 on a base film (not shown) and transferring the formed multilayer coat 30 to the base material 10. In this case, transferring may be performed, for example, by insert molding.

The reflector 100 having the above-described structure may have reflection properties as close as possible to those of gold. Accordingly, the reflection properties closer to gold can be achieved without using an expensive gold material, and product costs can be significantly reduced.

2. EXAMPLE

2. 1) Example 1

Figure 2:
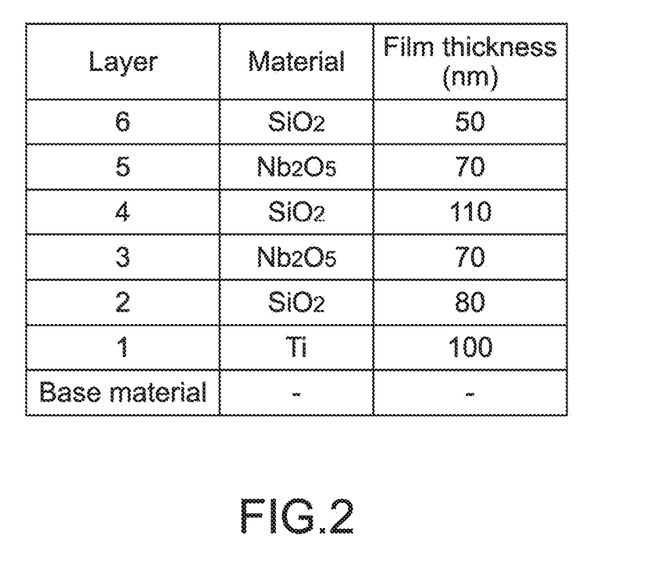
FIG. 2 is a table showing a material and a film thickness of each film of the multilayer coat 30 according to Example 1.

FIG. 2 is a table showing a material and a film thickness of each film of the multilayer coat 30 according to Example 1. The metal film 15 and the dielectric films 21 and 22 are formed in the order of layer numbers (1 to 6) from the base material 10 side.

Note that the structure of the reflector 100 of FIG. 1 is used commonly in Examples 1 to 3 including Examples 2 and 3 described later.

As a material of the metal film 15, Ti is used. It is intended to use a material having a reflectance as high as possible. The film thickness of Ti is 100 nm, for example.

In the multilayer film layer 20, $SiO_2$ is used as dielectric films having a low refractive index (first dielectric films 21) and $Nb_2O_5$ is used as dielectric films having a high refractive index (second dielectric films 22). A plurality of $SiO_2$ films and $Nb_2O_5$ films are alternately laminated and the multilayer film layer 20 has a five-layered structure. The film thicknesses of the dielectric films are 80 nm, 70 nm, 110 nm, 70 nm, and 50 nm in the order from the bottom layer side.

Figure 3A:
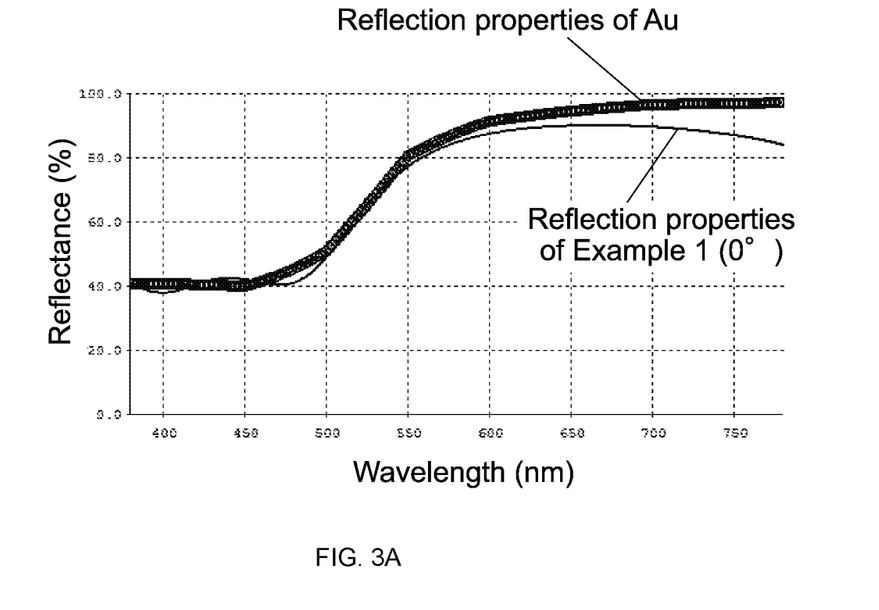
FIG. 3A shows reflectance spectra of Au as a comparative example and the reflector according to Example 1 in a visible light region.

FIG. 3A shows reflectance spectra of gold (Au) as a comparative example and the reflector according to Example 1 in a visible light region. In the present specification, waveforms of the reflectances of objects in the visible light region are referred to as "reflection properties". The reflection properties of Example 1 show the properties of reflected light at a light incidence angle of 0°, i.e., in a direction perpendicular to the surface of the reflector.

As shown in FIG. 3A, the reflection properties of Au have a feature of being small in a short wavelength region and great in a long wavelength region. The reflector of Example 1 can also have the reflection properties roughly same as those of Au.

Figure 3B:
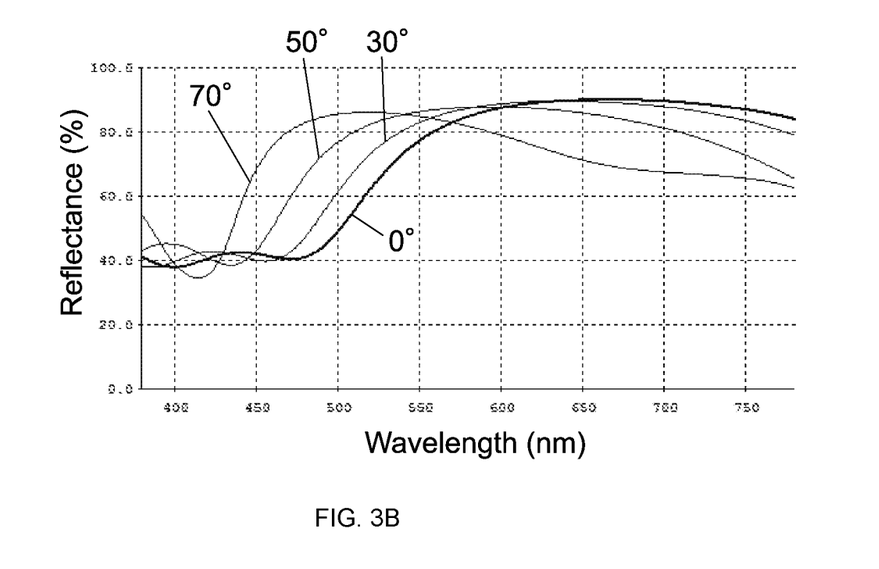
FIG. 3B shows light reflection properties of Example 1 at incidence angles of 0°, 30°, 50°, and 70°.

Note that FIG. 3B shows light reflection properties of Example 1 at the incidence angles of 0°, 30°, 50°, and 70°. It indicates that as the incidence angle is increased, each peak of the reflection properties of Example 1 is shifted more or less from the reflection properties of Au. This arises from the presence of the multilayer film layer 20.

2. 2) Example 2

Figure 4:
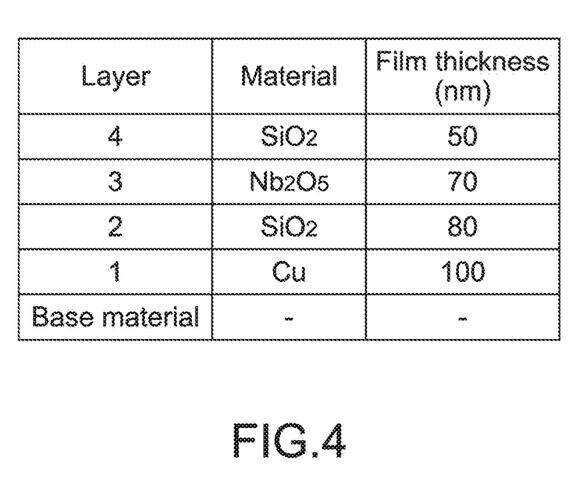
FIG. 4 is a table showing a material and a film thickness of each film of the multilayer coat 30 according to Example 2.

FIG. 4 is a table showing a material and a film thickness of each film of the multilayer coat 30 according to Example 2. The metal film 15 and the dielectric films 21 and 22 are formed in the order of layer numbers (1 to 4) from a base material 10 side.

As the material of the metal film 15, Cu having a low reflectance in a short wavelength side and a high reflectance in a long wavelength side is used. The firm thickness of Cu is 100 nm, for example.

In the multilayer film layer 20, $SiO_2$ is used as the first dielectric films 21 having a low refractive index and $Nb_2O_5$ is used as the second dielectric film 22 having a high refractive index, similar to Example 1. A plurality of $SiO_2$ films and a $Nb_2O_5$ film are alternately laminated, and the multilayer film layer 20 has a three-layered structure. The film thicknesses of the dielectric films are 80 nm, 70 nm, and 50 nm in the order from the bottom layer side.

Figure 5A:
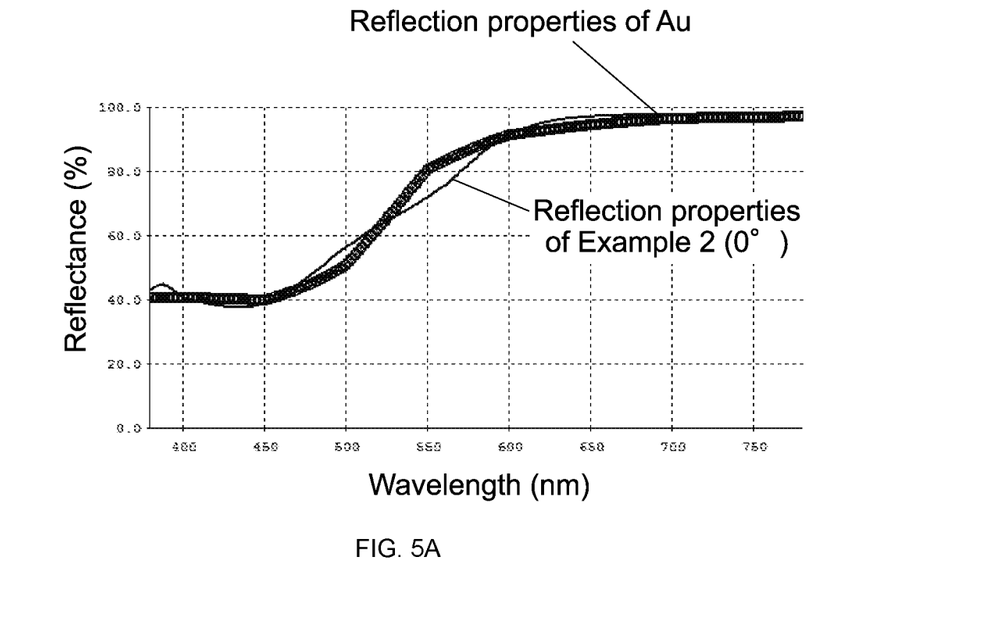
FIG. 5A shows reflectance spectra of Au as a comparative example and the reflector according to Example 2 in a visible light region (incidence angle of 0°).
Figure 5B:
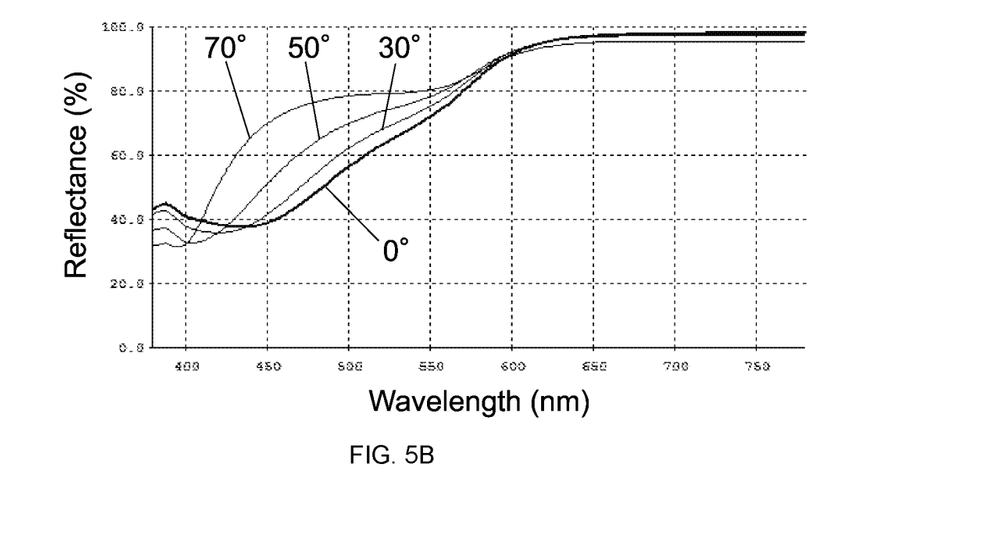
FIG. 5B shows light reflection properties of Example 2 at the incidence angles of 0°, 30°, 50°, and 70°.

FIG. 5A shows reflectance spectra of gold (Au) as a comparative example and the reflector according to Example 2 in a visible light region (incidence angle of 0°). FIG. 5B shows light reflection properties of Example 2 at the incidence angles of 0°, 30°, 50°, and 70°.

Since the reflection properties of Cu are close to those of gold, the total number of the dielectric films used to make optical waveforms close to gold can be reduced. Accordingly, the productivity is increased, and the costs can be reduced. In addition, the reflection properties of Cu itself suppress the influence of the change of the incidence angle in the multilayer film layer 20 on the peak shift, and the change of the reflection properties in a case where the incidence angle is increased can be suppressed as compared with Example 1.

2. 3) Example 3

Figure 6:
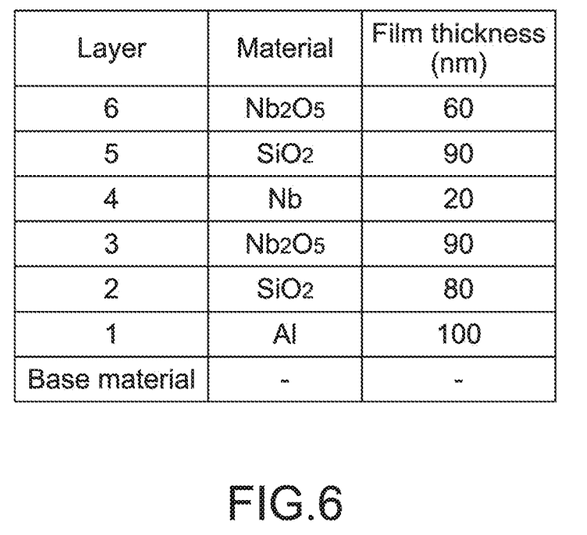
FIG. 6 is a table showing a material and a film thickness of each film of the multilayer coat 30 according to Example 3.

FIG. 6 is a table showing a material and a film thickness of each film of the multilayer coat 30 according to Example 3. The metal film 15 and the dielectric films 21 and 22 are formed in the order of layer numbers (1 to 6) from the base material 10 side.

As a material of the metal film 15, Al is used. The film thickness of Al is 100 nm, for example.

In the multilayer film layer 20, $SiO_2$ is used as first dielectric films 21 having a low refractive index and $Nb_2O_5$ is used as second dielectric films 22 having a high refractive index. In addition, the multilayer film layer 20 includes a metal thin-film, for example, as a thin-film having an extinction coefficient higher than an extinction coefficient of each of the plurality of dielectric films. In FIG. 1, the metal thin-film is not shown.

Desirably, a material of the metal thin-film has a refractive index of 2 or more. As the material of the metal thin-film, Ti, Ta, Fe, Mo, or W is used other than Nb. In particular, Nb having a small extinction coefficient is desirably used.

In the multilayer film layer 20, the metal thin-film (Nb) is disposed between a first layer pair including a second $SiO_2$ layer and a third $Nb_2O_5$ layer and a second layer pair including a fifth $SiO_2$ layer and a sixth $Nb_2O_5$ layer.

The film thicknesses of the dielectric films are 80 nm, 90 nm, 90 nm, and 60 nm in the order from the bottom layer side. The film thickness of the metal thin-film is 20 nm.

The film thickness of the metal thin-film is not limited to that of Example 3 and is defined as 10 nm or more and 30 nm or less. In a case where the film thickness of the metal thin-film is less than 15 nm, a manufacturing error may be increased and productivity may be decreased. In a case where the film thickness exceeds 30 nm, optical transparency is decreased and the reflectance is decreased. More preferably, the film thickness of the metal thin-film is 15 nm or more and 25 nm or less.

Figure 7A:
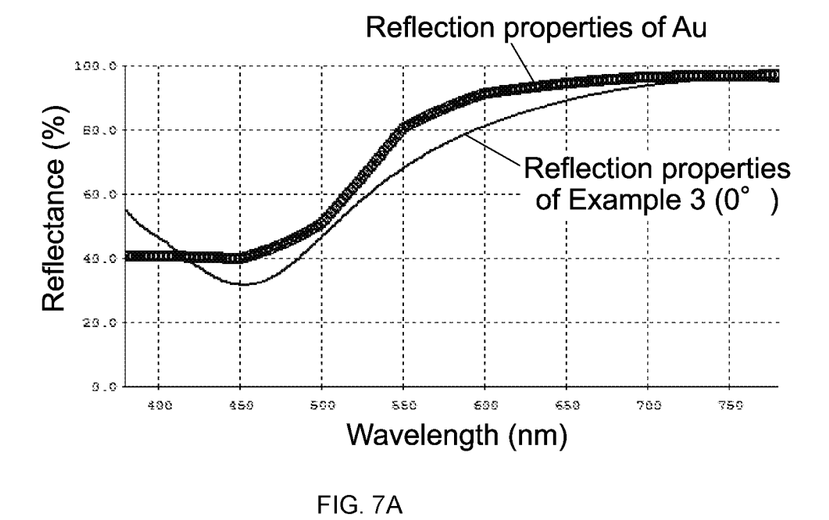
FIG. 7A shows reflectance spectra of Au as a comparative example and the reflector according to Example 3 in a visible light region (incidence angle of 0°).
Figure 7B:
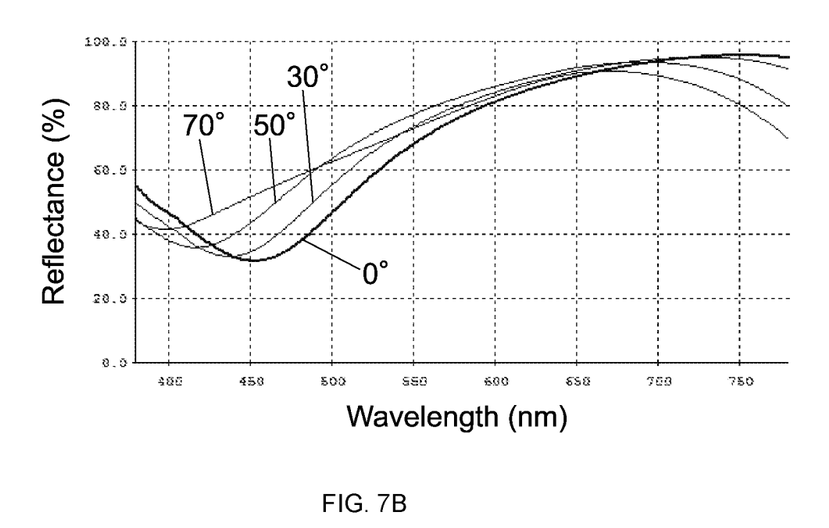
FIG. 7B shows light reflection properties of Example 3 at the incidence angles of 0°, 30°, 50°, and 70°.

FIG. 7A shows reflectance spectra of gold (Au) as a comparative example and the reflector according to Example 3 in a visible light region (incidence angle of 0°). FIG. 7B shows light reflection properties of Example 3 at the incidence angles of 0°, 30°, 50°, and 70°.

According to Example 3, since the metal thin-film is inserted in the multilayer film layer 20, the reflection properties in a case where the incidence angle is increased can be suppressed as compared with Example 2.

The smaller the extinction coefficient of the metal thin-film, e.g., Nb, is, the greater the film thickness can be set. In other words, in Example 3, no extremely thin-film needs to be produced, a manufacturing error is relatively decreased, and manufacturing stability is improved.

In addition, the first layer pair and the second layer pair are disposed as a lower layer and as an upper layer of the metal thin-film, respectively. As a result, desirable optical properties can be achieved.

Here, according to the above-described technology described in Patent Literature 3, a reflected waveform in a short wavelength side is greatly different from that of gold. In addition, in a case where an object is viewed obliquely, an apparent film thickness of a transparent film is changed. Accordingly, a color shift is increased as compared with a case where the object is viewed perpendicularly.

3. INCIDENCE ANGLE PROPERTIES OF COLOR DIFFERENCES BETWEEN REFLECTORS OF EXAMPLES AND GOLD

Figure 8:
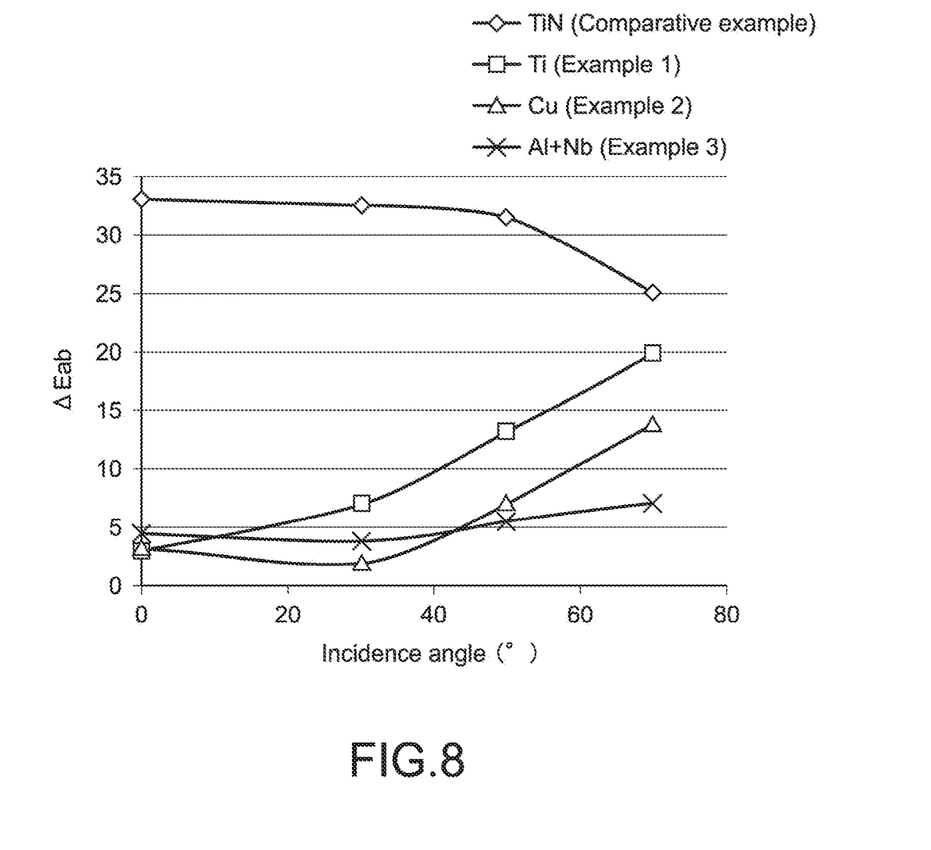
FIG. 8 is a graph showing results of calculating dependency of a color difference between the reflectors of Examples 1 to 3 and gold on the incidence angles.

FIG. 8 is a graph showing results of calculating dependency of color difference between the reflectors of Examples 1 to 3 and gold on the incidence angles. ΔEab indicates a color difference where a D65 light source was used. The ΔEab of 5 or less is generally allowable. Since the reflectance can be increased using the structures of Examples 1 to 3, the ΔEab can be significantly lowered as compared with a product including a TiN metal film as a comparative example (see Patent Literature 1, for example).

Furthermore, the structure of Example 3 satisfies the ΔEab of 5 or less by the incidence angle of around 50° and can have the value close to 5 even at the incidence angle of 70° as compared with other Examples.

4. OTHER VARIOUS EMBODIMENTS

The present technology is not limited to the above-described embodiments and other various embodiments can be realized.

For example, in the multilayer film layer 20 of Example 1, the film in contact with the metal film 15 is the first dielectric film ($SiO_2$) 21 having a low refractive index but may be the dielectric film ($Nb_2O_5$) 22 having a high refractive index. The same shall be applied to Example 3.

As in Example 2, in a case where the number of the dielectric films is three, the film in contact with the metal film 15 is desirably the first dielectric film 21 having a low refractive index. However, in Example 2, in a case where the number of the dielectric films is 4, 5, or more than 5, the film in contact with the film metal film 15 may be the second dielectric film 22 having a high refractive index.

It is possible to combine at least two features among the above-described features of the respective embodiments. For example, the multilayer film layer 20 of the reflector according to Example 1 may include the thin-film of the reflector according to Example 3 (for example, metal thin-film).

Ag, Ta, Nb, Co, Cu, Fe, In, Mn, Mo, or Ni may be used instead of the metal film 15 according to Examples 1 to 3.

It should be noted that the present technology may also have the following structures.

(1) A gold color tone multilayer coat, including:
a metal film; and
a multilayer film layer including a plurality of dielectric films, the dielectric films respectively having two or more different refractive indices, and the dielectric films having different refractive indices being alternately laminated.

(2) The gold color tone multilayer coat according to (1), in which
the multilayer film layer includes a thin-film having an extinction coefficient higher than an extinction coefficient of each of the plurality of dielectric films.

(3) The gold color tone multilayer coat according to (1) or (2), in which
the metal film is formed of Al, Ag, Cu, Ti, Ta, Nb, Co, Cu, Fe, In, Mn, Mo, Ni, or W.

(4) The gold color tone multilayer coat according to any one of (1) to (3), in which
the multilayer film layer includes $SiO_2$, and $Nb_2O_5$, $Ta_2O_5$, or $TiO_2$ having a refractive index higher than a refractive index of the $SiO_2$.

(5) The gold color tone multilayer coat according to (1), in which
the metal film is formed of Ti, and
the multilayer film layer includes at least five dielectric films.

(6) The gold color tone multilayer coat according to (1), in which
the metal film is formed of Cu, and
the multilayer film layer includes at least three dielectric films.

(7) The gold color tone multilayer coat according to (2), in which
the metal film is formed of Al, and
the multilayer film layer includes at least five dielectric films.

(8) The gold color tone multilayer coat according to any one of (2) to (7), in which
the multilayer film layer includes
a first layer pair including a first dielectric film and a second dielectric film having a refractive index higher than a refractive index of the first dielectric film, and
a second layer pair including the first dielectric film and the second dielectric film, and
the thin-film is disposed between the first layer pair and the second pair.

(9) A reflector, including:
a base material; and
a gold color tone multilayer coat disposed on the base material, the gold color tone multilayer coat including
a metal film disposed on the base material, and
a multilayer film layer including a plurality of dielectric films, the dielectric films respectively having two or more different refractive indices, and the dielectric films having different refractive indices being alternately laminated.

REFERENCE SIGNS LIST

10 base material
15 metal film
20 multilayer film layer
21 first dielectric film
22 second dielectric film
30 multilayer coat
100 reflector

The invention claimed is:

1. A gold color tone multilayer coat, comprising:
a metal film; and
a multilayer film layer including:
a plurality of dielectric films that includes:
a first set of dielectric films having a first refractive index; and
a second set of dielectric films having a second refractive index different from the first refractive index,
wherein the first set of dielectric films and the second set of dielectric films are alternately laminated; and
a thin-film having an extinction coefficient higher than an extinction coefficient of each of the plurality of dielectric films.

2. The gold color tone multilayer coat according to claim 1, wherein the metal film includes one of Al, Ag, Cu, Ti, Ta, Nb, Co, Fe, In, Mn, Mo, Ni, or W.

3. The gold color tone multilayer coat according to claim 1, wherein
the multilayer film layer includes SiO2 and one of Nb2O5, Ta2O5, or TiO2; and
each of Nb2O5, Ta2O5, and TiO2 has a refractive index higher than a refractive index of SiO2.

4. The gold color tone multilayer coat according to claim 1, wherein
the metal film includes Ti, and
the plurality of dielectric films includes at least five dielectric films.

5. The gold color tone multilayer coat according to claim 1, wherein
the metal film includes Cu, and
the plurality of dielectric films includes at least three dielectric films.

6. The gold color tone multilayer coat according to claim 1, wherein
the metal film includes Al, and the plurality of dielectric films includes at least five dielectric films.

7. The gold color tone multilayer coat according to claim 1, wherein
the multilayer film layer includes a first layer pair and a second layer pair,
each of the first layer pair and the second layer pair includes:
  a first dielectric film from the first set of dielectric films; and
  a second dielectric film from the second set of dielectric films,
the refractive index of the second dielectric film is higher than the refractive index of the first dielectric film, and
the thin-film is between the first layer pair and the second layer pair.

8. A reflector, comprising:
a base material; and
a gold color tone multilayer coat on the base material, wherein the gold color tone multilayer coat includes:
a metal film on the base material; and
a multilayer film layer including:
  a plurality of dielectric films that includes:
    a first set of dielectric films having a first refractive index; and
    a second set of dielectric films having a second refractive index different from the first refractive index,
    wherein the first set of dielectric films and the second set of dielectric films are alternately laminated; and
  a thin-film having an extinction coefficient higher than an extinction coefficient of each of the plurality of dielectric films.

* * * * *